(12) United States Patent
Wu et al.

(10) Patent No.: US 8,861,160 B2
(45) Date of Patent: Oct. 14, 2014

(54) INTEGRATED CIRCUIT HAVING ESD PROTECTION CAPABILITY

(75) Inventors: Chien-Ming Wu, Taoyuan County (TW); Kai-Yin Liu, Kaohsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 91 days.

(21) Appl. No.: 13/401,865

(22) Filed: Feb. 22, 2012

(65) Prior Publication Data

US 2012/0229940 A1    Sep. 13, 2012

(30) Foreign Application Priority Data

Mar. 10, 2011   (TW) .............................. 100108064 A

(51) Int. Cl.
  *H02H 3/20*      (2006.01)
  *H03K 17/082*    (2006.01)
  *H03K 19/003*    (2006.01)
  *H02H 9/04*      (2006.01)

(52) U.S. Cl.
  CPC ..................................... *H02H 9/046* (2013.01)
  USPC ............................ 361/91.1; 361/56; 361/111

(58) Field of Classification Search
  CPC .............. H02H 3/202; H03K 17/0822; H03K 19/00315
  USPC .......................................... 361/56, 91.1, 111
  See application file for complete search history.

(56) References Cited

U.S. PATENT DOCUMENTS

| | | | |
|---|---|---|---|
| 5,523,721 A * | 6/1996 | Segawa et al. ................... 330/86 |
| 6,147,558 A * | 11/2000 | Sculley ......................... 330/284 |
| 6,545,534 B1 | 4/2003 | Mehr | |
| 8,472,894 B2 * | 6/2013 | Wang et al. .................... 455/107 |
| 2005/0017796 A1 * | 1/2005 | Tanizawa ....................... 327/562 |
| 2008/0218244 A1 * | 9/2008 | Oishi et al. ..................... 327/389 |

FOREIGN PATENT DOCUMENTS

CN         101751902 A     6/2010

OTHER PUBLICATIONS

AN208 A High-Performance, Low Cost Analog Switch Family, Aug. 10, 1999, Vishay Siliconix Co., pp. 6-1-6-7, www.vishay.com.*

* cited by examiner

*Primary Examiner* — Zeev V Kitov
(74) *Attorney, Agent, or Firm* — Winston Hsu; Scott Margo

(57) ABSTRACT

The present invention provides an integrated circuit having a better ESD protection capability and capable of reducing a circuit layout area. The integrated circuit comprises: an internal circuit, a first pad, and at least a first impedance matching unit. The first impedance matching unit is coupled between the internal circuit and the first pad, and the first impedance matching unit comprises: a first switch unit and a first resistance unit. The first switch unit is coupled to the internal circuit, and the first resistance unit is coupled between the first switch unit and the first pad, wherein the first resistance unit has a first terminal and a second terminal. The first terminal is directly electrically connected to the first pad and the second terminal is coupled to the first switch unit.

18 Claims, 11 Drawing Sheets

INTEGRATED CIRCUIT HAVING ESD PROTECTION CAPABILITY

BACKGROUND OF THE INVENTION

1. Field of the Invention

The present invention relates to an integrated circuit, and more particularly, to an integrated circuit which has a better ESD protection capability and is able to reduce circuit layout area.

2. Description of the Prior Art

Please refer to FIG. 1. FIG. 1 shows a simplified block diagram of a conventional integrated circuit 100, wherein the integrated circuit 100 can be applied to a communication device. As shown in FIG. 1, the integrated circuit 100 comprises: an internal circuit 102, a pad 104, a second resistance unit 106, and two first impedance matching units 110, wherein the two first impedance matching units 110 are connected in parallel with each other. The second resistance unit 106 is coupled between the pad 104 and the internal circuit 102, and connected in parallel with the two impedance matching units 110. Each impedance matching unit 110 is coupled between the internal circuit 102 and the pad 104, and each impedance matching unit 110 comprises: a switch unit 112 and a first resistance unit 114. The first resistance unit 114 is coupled between the first switch unit 112 and the internal circuit 102, and the switch unit 112 is directly electrically connected to the pad 104. Thus, the conventional integrated circuit 100 has a good linearity, however, the switch unit 112 will be directly damaged when ESD enters into the pad 104. In addition, when the switch unit 112 is realized by a MOS transistor switch, the ESD protection rules are required to be followed in the layout since the switch unit 112 is directly electrically connected to the pad 104. In this way, realizing the switch unit 112 with the MOS transistor switch requires a very large circuit layout area.

Please refer to FIG. 2. FIG. 2 shows a simplified block diagram of another conventional integrated circuit 200, wherein the integrated circuit 200 can be applied to a communication device. As shown in FIG. 2, the integrated circuit 200 comprises: an internal circuit 202, a first pad 204, a second pad 206, two first impedance matching units 210, two second impedance matching units 220, a third switch unit 230, a third resistance unit 240, and a fourth resistance unit 250, wherein the two first impedance matching units 210 are connected in parallel with each other, and the two second impedance matching units 220 are connected in parallel with each other. Each first impedance matching unit 210 is coupled between the internal circuit 202 and the first pad 204, and each first impedance matching unit 210 comprises: a first switch unit 212 and a first resistance unit 214, wherein the first switch unit 212 is directly electrically connected to the first pad 204. Each second impedance matching unit 220 is coupled between the internal circuit 202 and the second pad 206, and each second impedance matching unit 220 comprises: a second switch unit 222 and a second resistance unit 224, wherein the second switch unit 222 is directly electrically connected to the second pad 206. Similarly, the first switch unit 212 will be directly damaged when ESD enters into the first pad 204, and the second switch unit 222 will be directly damaged when ESD enters into the second pad 206. In addition, when the first switch unit 212 and the second switch unit 222 are respectively realized by a MOS transistor switch, the ESD protection rules are required to be followed in the layout since the first switch unit 212 and the second switch unit 222 are directly electrically connected to the first pad 204 and the second pad 206, respectively. In this way, realizing the first switch unit 212 and the second switch unit 222 with the MOS transistor switch respectively requires a very large circuit layout area. In addition, the integrated circuit 200 of the present invention can turn off the internal circuit 202 in certain power saving mode, and uses the third switch unit 230 to perform the function of impedance calibration, wherein the third switch unit 230 has very low power consumption. However, since the resistance value of two first impedance matching units 210 and the third resistance unit 240 connected in parallel with each other is very small, and the resistance value of two second impedance matching units 220 and the fourth resistance unit 250 connected in parallel with each other is also very small, the third switch unit 230 will be damaged easily and directly when ESD enters into the first pad 204 and/or the second pad 206.

SUMMARY OF THE INVENTION

It is therefore one of the objectives of the present invention to provide an integrated circuit which has a better ESD protection capability and is able to reduce circuit layout area, so as to solve the above problem.

In accordance with an embodiment of the present invention, an integrated circuit is disclosed. The integrated circuit comprises: an internal circuit, a first pad, and at least a first impedance matching unit. The first impedance matching unit is coupled between the internal circuit and the first pad, and the first impedance matching unit comprises: a first switch unit and a first resistance unit. The first switch unit is coupled to the internal circuit, and the first resistance unit is coupled between the first switch unit and the first pad, wherein the first resistance unit has a first terminal and a second terminal, the first terminal is directly electrically connected to the first pad, and the second terminal is coupled to the first switch unit.

Briefly summarized, the integrated circuit disclosed by the present invention has a better ESD protection capability and is able to reduce circuit layout area.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 3:
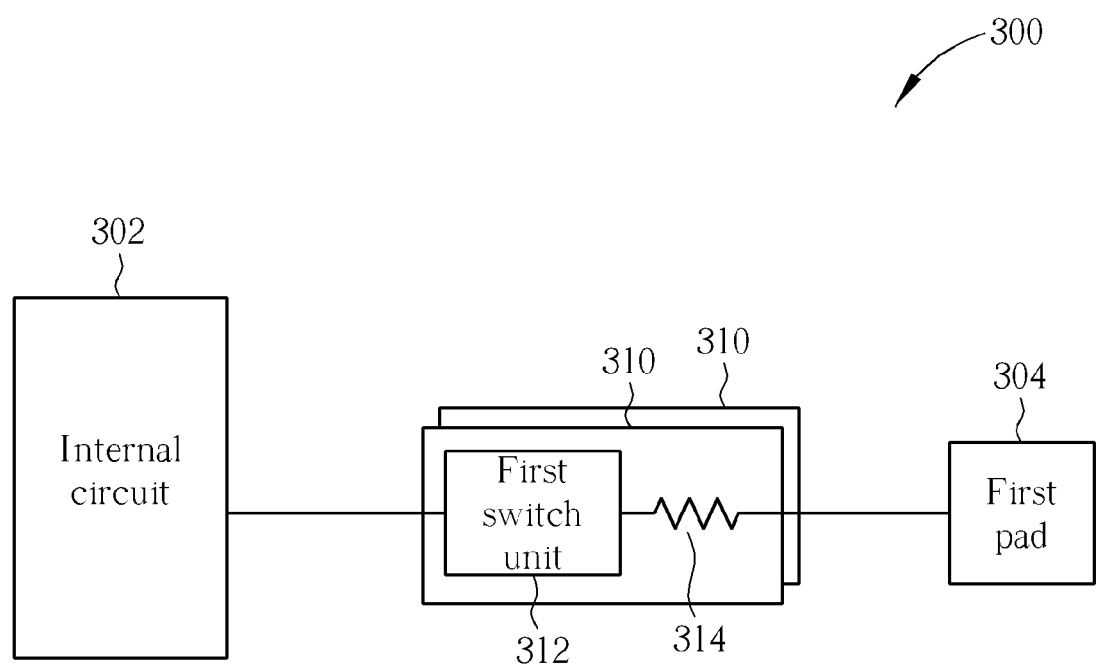
FIG. 3 shows a simplified block diagram of an integrated circuit in accordance with a first embodiment of the present invention.

Please refer to FIG. 3. FIG. 3 shows a simplified block diagram of an integrated circuit 300 in accordance with a first embodiment of the present invention, wherein the integrated circuit 300 can be applied to a communication device. As shown in FIG. 3, the integrated circuit 300 comprises: an internal circuit 302, a first pad 304, and two first impedance matching units 310, wherein the two first impedance matching units 310 are connected in parallel with each other. Each first impedance matching unit 310 is coupled between the internal circuit 302 and the first pad 304, and each first impedance matching unit 310 comprises: a first switch unit 312 and a first resistance unit 314. The first switch unit 312 is coupled to the internal circuit 302, and the first resistance unit 314 is coupled between the first switch unit 312 and the first pad 304, wherein the first resistance unit 314 has a first terminal and a second terminal, the first terminal is directly electrically connected to the first pad 304, and the second terminal is coupled to the first switch unit 312. A resistance value of the first resistance unit 314 can be in a range of 10~10000 Ohm. Please note that the above embodiment is only for an illustrative purpose and is not meant to be a limitation of the present invention. In this way, the first resistance unit 314 positioned between the first switch unit 312 and the first pad 304 can be utilized for preventing the first switch unit 312 from being directly damaged when ESD enters into the first pad 304. In addition, when the first switch unit 312 is realized by a MOS transistor switch, the ESD protection rules are not required to be followed in the layout since the first switch unit 312 is not directly electrically connected to the first pad 304. In this way, the circuit layout area required by realizing the first switch unit 312 with the MOS transistor switch can be reduced. Please note that the above embodiment is only for an illustrative purpose and is not meant to be a limitation of the present invention. For example, the amounts of the first impedance matching unit 310 and the resistance value of the first resistance unit 314 can be changed according to different design requirements. For example, the integrated circuit 300 of the present invention also can comprise only one first impedance matching unit 310.

Figure 4:
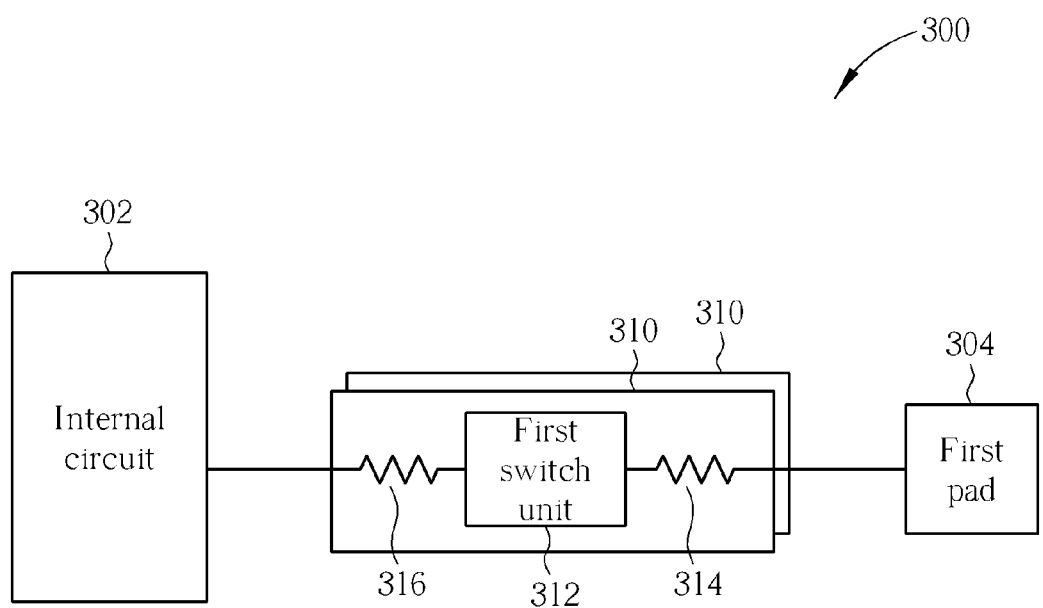
FIG. 4 shows a simplified block diagram of an integrated circuit in accordance with a second embodiment of the present invention.
Figure 5:
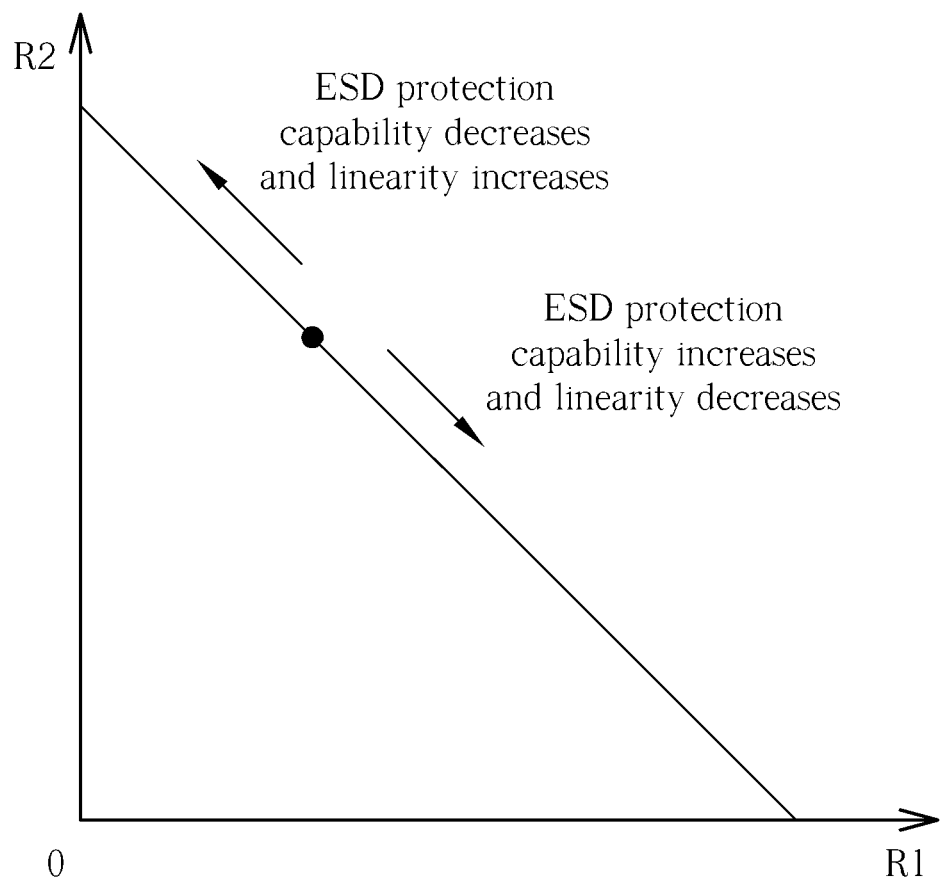
FIG. 5 shows a relation between the variations of the ESD protection capability and linearity of the first impedance matching unit in FIG. 4 and the variations of the resistance value R1 of the first resistance unit in FIG. 4 and the resistance value R2 of the second resistance unit in FIG. 4.

In a second embodiment of the present invention, the first impedance matching unit 310 can further comprise a second resistance unit 316 coupled between the first switch unit 312 and the internal circuit 302 as shown in FIG. 4, wherein a linearity and an ESD protection capability of the first impedance matching unit 310 can be decided by a ratio between the resistance value of the first resistance unit 314 and the resistance value of the second resistance unit 316. More specifically, presumed that the resistance value of the first resistance unit 314 is R1 and the resistance value of the second resistance unit 316 is R2, when R1/R2 is larger, the first impedance matching unit 314 has higher ESD protection capability and lower linearity. When R1/R2 is smaller, the first impedance matching unit 314 has lower ESD protection capability and higher linearity. For example, presumed that a sum of the resistance value R1 of the first resistance unit 314 and the resistance value R2 of the second resistance unit 316 is a fixed value such as R1+R2=1000 Ohm, the ESD protection capability of the first impedance matching unit 314 when R1 equals to 100 Ohm is better than the ESD protection capability of the first impedance matching unit 314 when R1 equals to 50 Ohm. Please refer to FIG. 5. FIG. 5 shows a relation between the variations of the ESD protection capability and linearity of the first impedance matching unit 314 and the variations of the resistance value R1 of the first resistance unit 314 and the resistance value R2 of the second resistance unit 316. As shown in FIG. 5, when R1 becomes larger and R2 becomes smaller, the linearity of the first impedance matching unit 310 will be decreased and the ESD protection capability of the first impedance matching unit 310 will be increased. On the contrary, when R2 becomes larger and R1 becomes smaller, the linearity of the first impedance matching unit 310 will be increased and the ESD protection capability of the first impedance matching unit 310 will be decreased. Please note that the above embodiment is only for an illustrative purpose and is not meant to be a limitation of the present invention. For example, the sum of the resistance value R1 of the first resistance unit 314 and the resistance value R2 of the second resistance unit 316 is not necessarily to a fixed value, and this part can be changed according to different design requirements. In addition, when the resistance value R1 of the first resistance unit 314 is larger than 10 Ohm in the present invention, the first impedance matching unit 310 can have a basic ESD protection capability. Of course, if the first impedance matching unit 310 is required to have a higher ESD protection capability according to other design requirements, the present invention can increase the resistance value R1 of the first resistance unit 314 to achieve the above objective. Thus, the present invention can adjust the ratio between the resistance value of the first resistance unit 314 and the resistance value of the second resistance unit 316 according to different design requirements.

Figure 6:
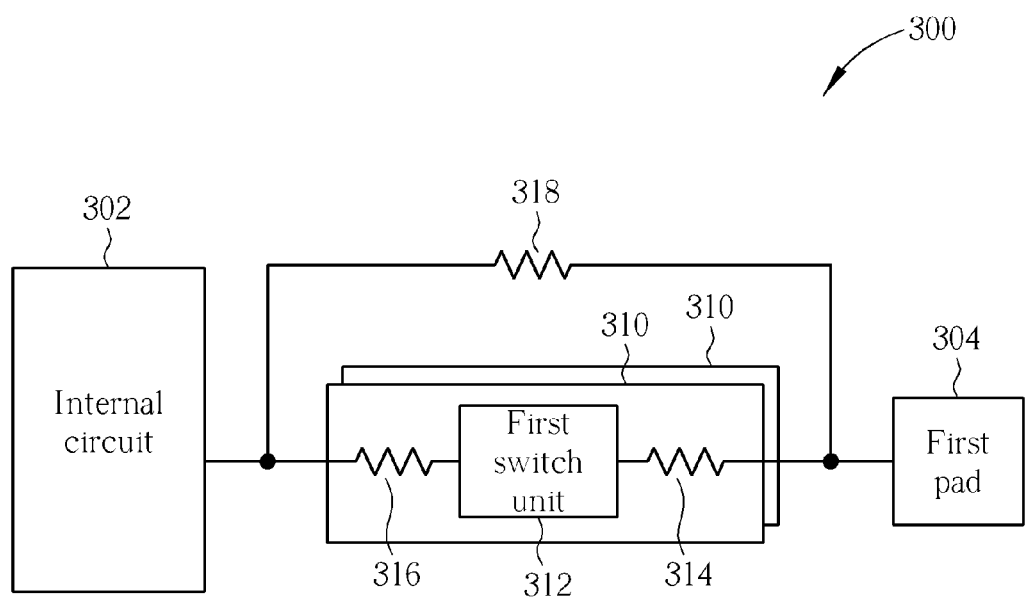
FIG. 6 shows a simplified block diagram of an integrated circuit in accordance with a third embodiment of the present invention.
Figure 7:
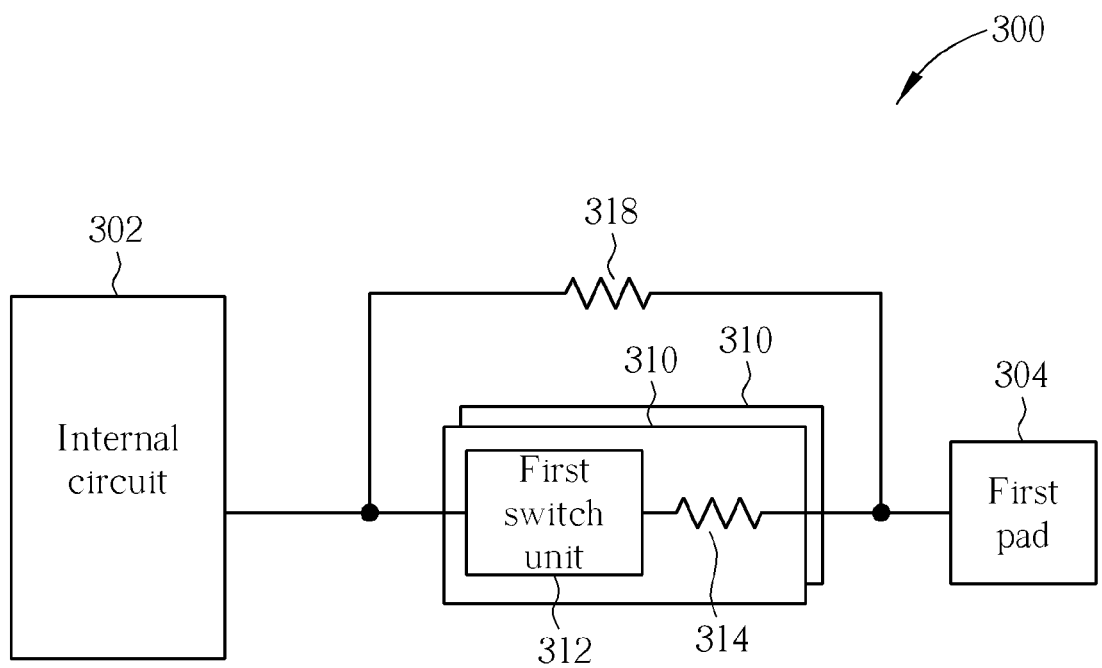
FIG. 7 shows a simplified block diagram of an integrated circuit in accordance with a fourth embodiment of the present invention.

Next, in a third embodiment of the present invention, the first impedance matching unit 310 in FIG. 4 can further comprise a third resistance unit 318 coupled between the first pad 304 and the internal circuit 302, and connected in parallel with the first impedance matching unit 310, as shown in FIG. 6. In a fourth embodiment of the present invention, the first impedance matching unit 310 in FIG. 3 can further comprise a third resistance unit 318 coupled between the first pad 304 and the internal circuit 302, and connected in parallel with the first impedance matching unit 310, as shown in FIG. 7.

Figure 8:
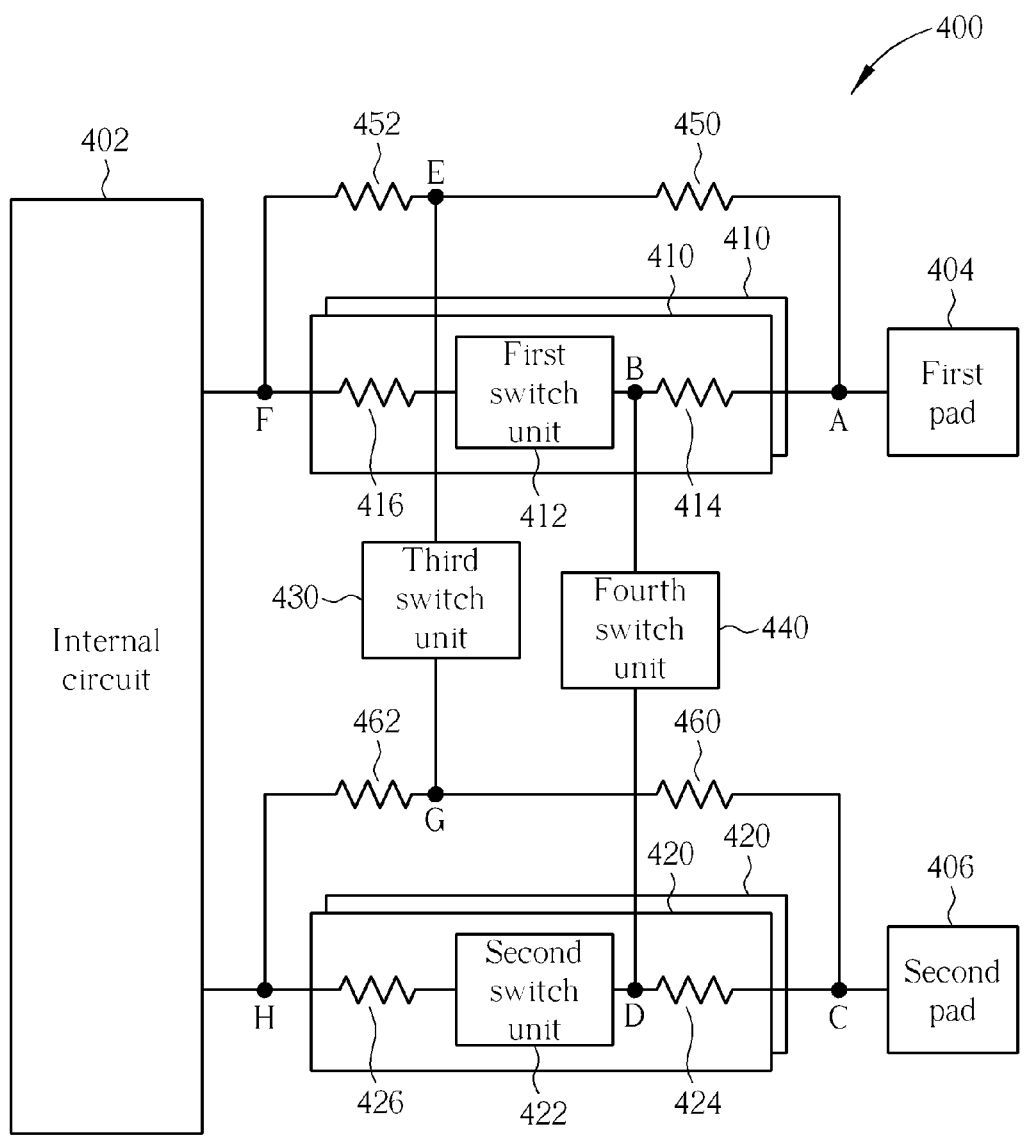
FIG. 8 shows a simplified block diagram of an integrated circuit in accordance with a fifth embodiment of the present invention.

Please refer to FIG. 8. FIG. 8 shows a simplified block diagram of an integrated circuit 400 in accordance with a first embodiment of the present invention, wherein the integrated circuit 400 can be applied to a communication device. As shown in FIG. 8, the integrated circuit 400 comprises: an internal circuit 402, a first pad 404, a second pad 406, two first impedance matching units 410, two second impedance matching units 420, a third switch unit 430, a fourth switch unit 440, a third resistance unit 450, a seventh resistance unit 452, a fifth resistance unit 460, and a sixth resistance unit 462, wherein the two first impedance matching units 410 are connected in parallel with each other, and the two second impedance matching units 420 are connected in parallel with each other. Each first impedance matching unit 410 is coupled between the internal circuit 402 and the first pad 404, and each first impedance matching unit 410 comprises: a first switch unit 412, a first resistance unit 414, and a second resistance unit 416. The second resistance unit 416 is coupled between the first switch unit 412 and the internal circuit 402, and the first switch unit 412 is coupled between the first resistance unit 414 and the second resistance unit 416. The first resistance unit 414 is coupled between the first switch unit 412 and the first pad 404, wherein the first resistance unit 414 has a first terminal A and a second terminal B, the first terminal A is directly electrically connected to the first pad 404, and the second terminal B is coupled to the first switch unit 412. A resistance value of the first resistance unit 414 can be in a range of 10~10000 Ohm. Please note that the above embodiment is only for an illustrative purpose and is not meant to be a limitation of the present invention. In this way, the first resistance unit 414 positioned between the first switch unit 412 and the first pad 404 can be utilized for preventing the first switch unit 412 from being directly damaged when ESD enters into the first pad 404. In addition, when the first switch unit 412 is realized by a MOS transistor switch, the ESD protection rules are not required to be followed in the layout since the first switch unit 412 is not directly electrically connected to the first pad 404. In this way, the circuit layout area required by realizing the first switch unit 412 with the MOS transistor switch can be reduced.

Similar to each first impedance matching unit 410, each second impedance matching unit 420 is coupled between the internal circuit 402 and the second pad 406, and each first impedance matching unit 410 comprises: a second switch unit 422, a fourth resistance unit 424, and an eighth resistance unit 426. The eighth resistance unit 426 is coupled between the second switch unit 422 and the internal circuit 402, and the second switch unit 422 is coupled between the fourth resistance unit 424 and the eighth resistance unit 426. The fourth resistance unit 424 is coupled between the second switch unit 422 and the second pad 406, wherein the fourth resistance unit 424 has a first terminal C and a second terminal D, the first terminal C is directly electrically connected to the second pad 406, and the second terminal D is coupled to the second switch unit 422. A resistance value of the fourth resistance unit 424 can be in a range of 10~10000 Ohm. Please note that the above embodiment is only for an illustrative purpose and is not meant to be a limitation of the present invention. In this way, the fourth resistance unit 424 positioned between the second switch unit 422 and the second pad 406 can be utilized for preventing the second switch unit 422 from being directly damaged when ESD enters into the second pad 406. In addition, when the second switch unit 422 is realized by a MOS transistor switch, the ESD protection rules are not required to be followed in the layout since the second switch unit 422 is not directly electrically connected to the second pad 406. In this way, the circuit layout area required by realizing the second switch unit 422 with the MOS transistor switch can be reduced.

Figure 9:
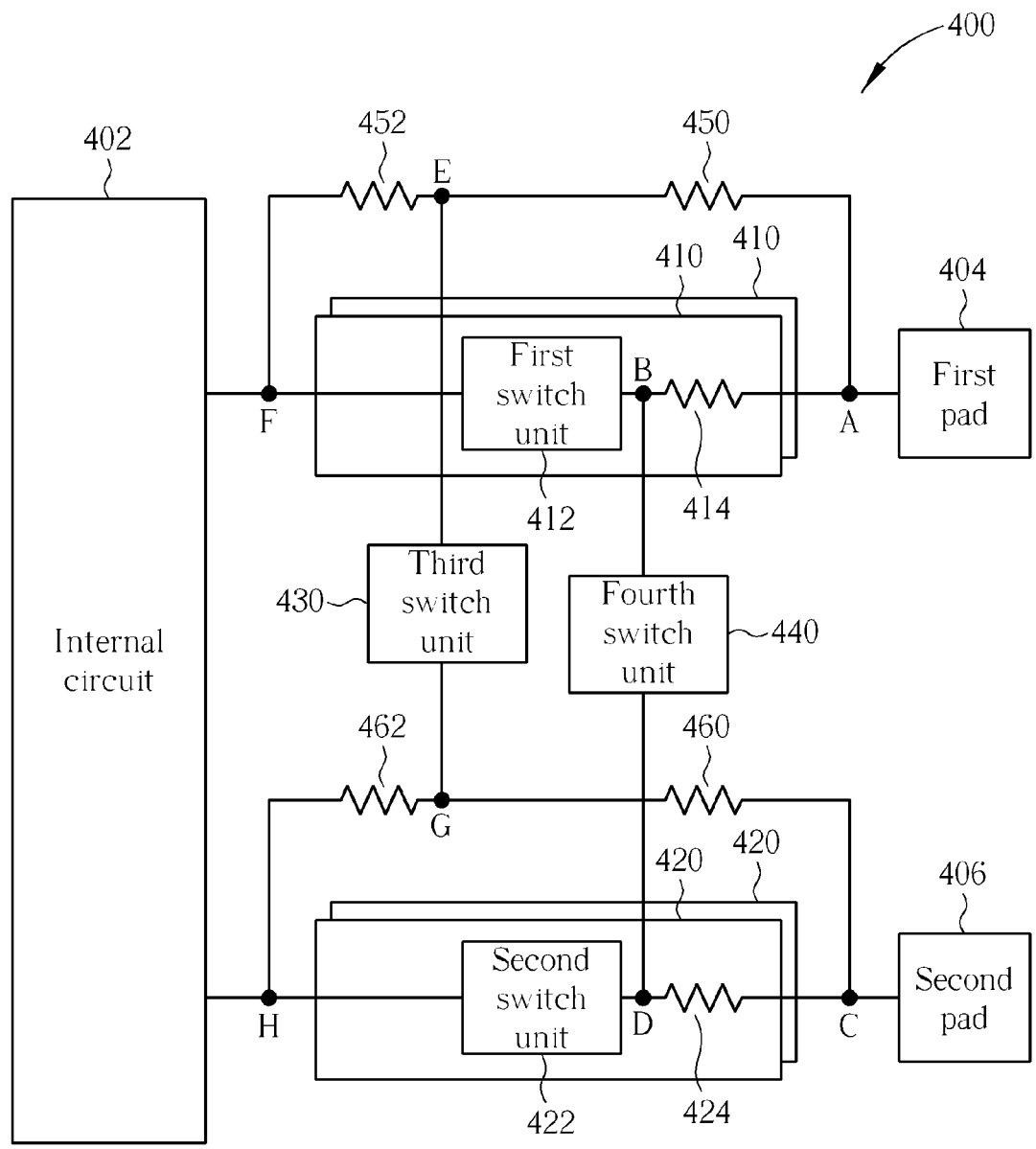
FIG. 9 shows a simplified block diagram of an integrated circuit in accordance with a sixth embodiment of the present invention.
Figure 10:
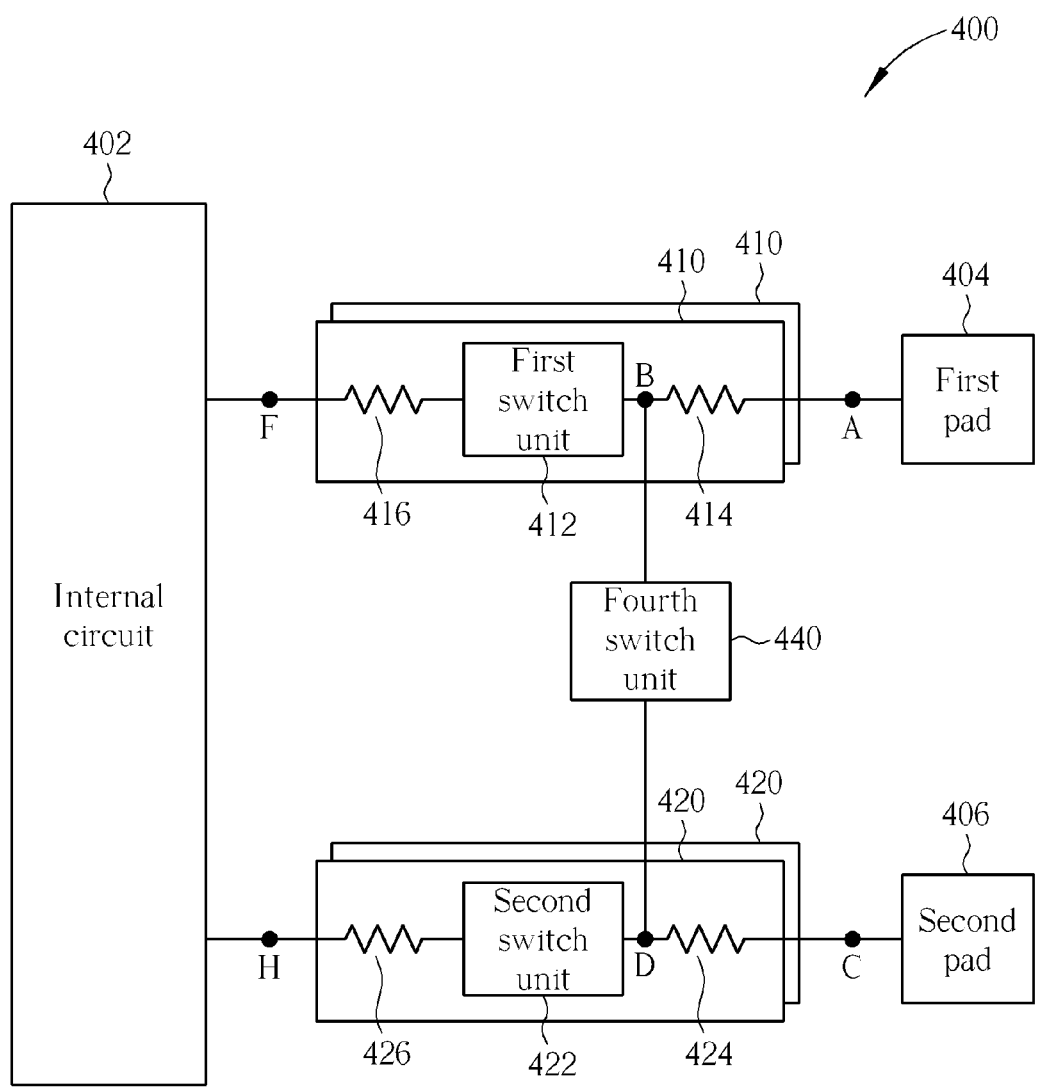
FIG. 10 shows a simplified block diagram of an integrated circuit in accordance with a seventh embodiment of the present invention.
Figure 11:
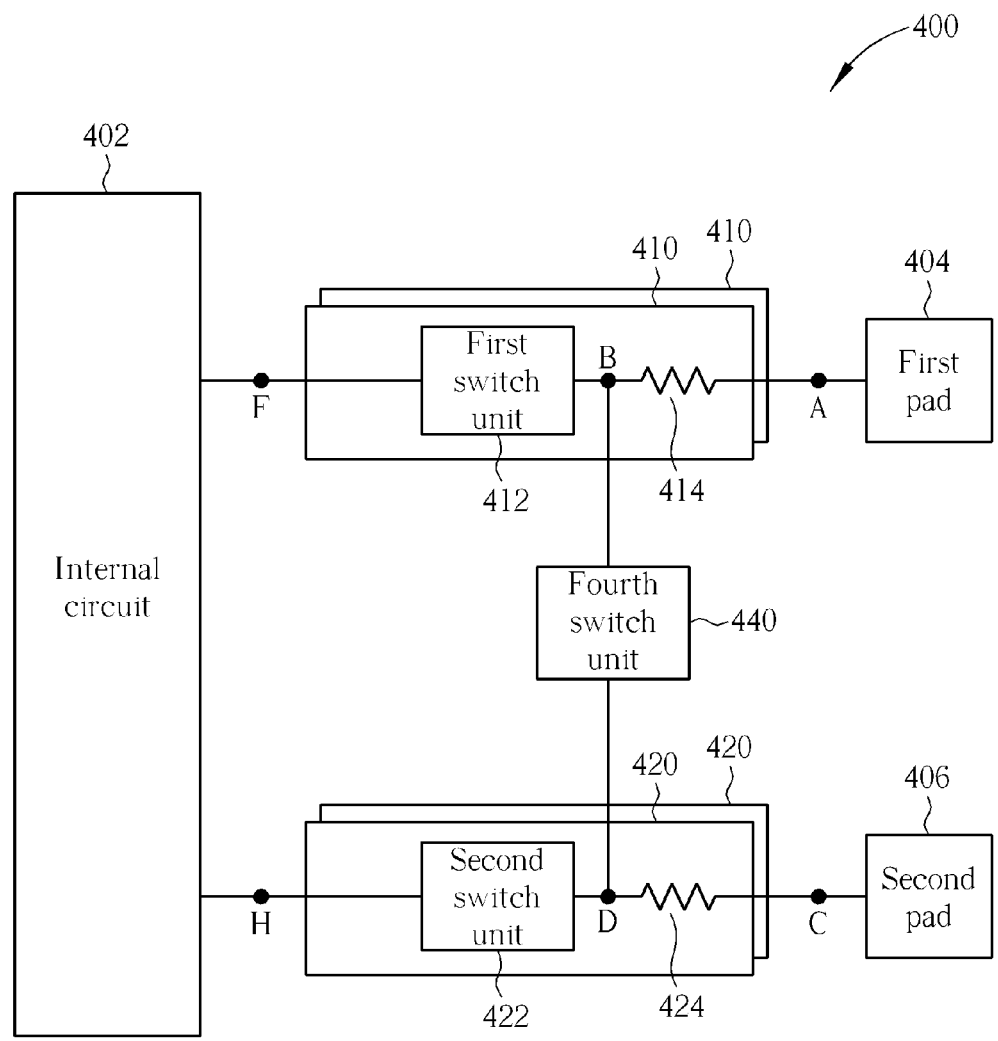
FIG. 11 shows a simplified block diagram of an integrated circuit in accordance with a eighth embodiment of the present invention.

The third resistance unit 450 has a first terminal and a second terminal, and the seventh resistance unit 452 has a first terminal E and a second terminal F, wherein the first terminal of the third resistance unit 450 is directly electrically connected to the first pad 404 and the first terminal A of the first resistance unit 414, the second terminal of the third resistance unit 450 is coupled to the first terminal E of the seventh resistance unit 452, and the second terminal F of the seventh resistance unit 452 is coupled to the internal circuit 402 and the first impedance matching unit 410. The fifth resistance unit 460 has a first terminal and a second terminal, and the sixth resistance unit 462 has a first terminal G and a second terminal H, wherein the first terminal of the fifth resistance unit 460 is directly electrically connected to the second pad 406 and the first terminal C of the fourth resistance unit 424, the second terminal of the fifth resistance unit 460 is coupled to the first terminal G of the sixth resistance unit 462, and the second terminal H of the sixth resistance unit 462 is coupled to the internal circuit 402 and the second impedance matching unit 420. The resistance values of the third resistance unit 450, the seventh resistance unit 452, the fifth resistance unit 460, and the sixth resistance unit 462 can be in a range of 10~10000 Ohm. In addition, the integrated circuit 400 of the present invention can turn off the internal circuit 402 in certain power saving mode, and uses the third switch unit 430 and the fourth switch unit 440 to perform the function of impedance calibration, wherein both the third switch unit 430 and the fourth switch unit 440 have very low power consumption. The third switch unit 430 is directly electrically connected between the first terminal E of the seventh resistance unit 452 and the first terminal G of the sixth resistance unit 462, and the fourth switch unit 440 is directly electrically connected between the second terminal B of the first resistance unit 414 and the second terminal D of the fourth resistance unit 424. In this way, the third resistance unit 450 and the fifth resistance unit 460 can be utilized for preventing the third switch unit 430 from being directly damaged when ESD enters into the first pad 404 and/or the second pad 406, and the first resistance unit 414 and the fourth resistance unit 424 can be utilized for preventing the fourth switch unit 440 from being directly damaged when ESD enters into the first pad 404 and/or the second pad 406. Please note that the above embodiment is only for an illustrative purpose and is not meant to be a limitation of the present invention. For example, the amounts of the first impedance matching unit 410 the second impedance matching unit 420, and the resistance value of the first resistance unit 414, the second resistance unit 416, the fourth resistance unit 424, the eighth resistance unit 426, the third resistance unit 450, the seventh resistance unit 452, the fifth resistance unit 460 and the sixth resistance unit 462 can be changed according to different design requirements. In addition, the implementations of the second resistance unit 416, the eighth resistance unit 426, the third resistance unit 450, the seventh resistance unit 452, the fifth resistance unit 460, the sixth resistance unit 462, and the third switch unit 430 in FIG. 8 also can be changed according to different design requirements. For example, in a sixth embodiment of the present invention, the second resistance unit 416 and the eighth resistance unit 426 in FIG. 8 can be omitted, as shown in FIG. 9. In a seventh embodiment of the present invention, the third resistance unit 450, the seventh resistance unit 452, the fifth resistance unit 460, the sixth resistance unit 462, and the third switch unit 430 in FIG. 8 can be omitted, as shown in FIG. 10. In an eighth embodiment of the present invention, the second resistance unit 416, the eighth resistance unit 426, the third resistance unit 450, the seventh resistance unit 452, the fifth resistance unit 460, the sixth resistance unit 462, and the third switch unit 430 in FIG. 8 can be omitted, as shown in FIG. 11.

Figure 1:
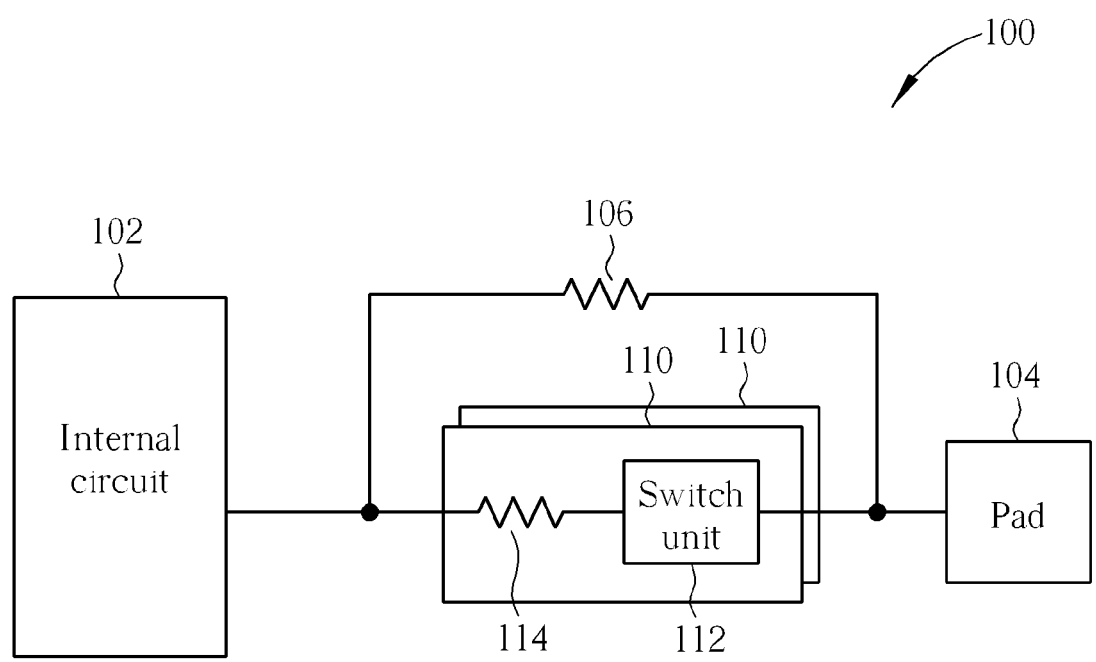
FIG. 1 shows a simplified block diagram of a conventional integrated circuit.
Figure 2:
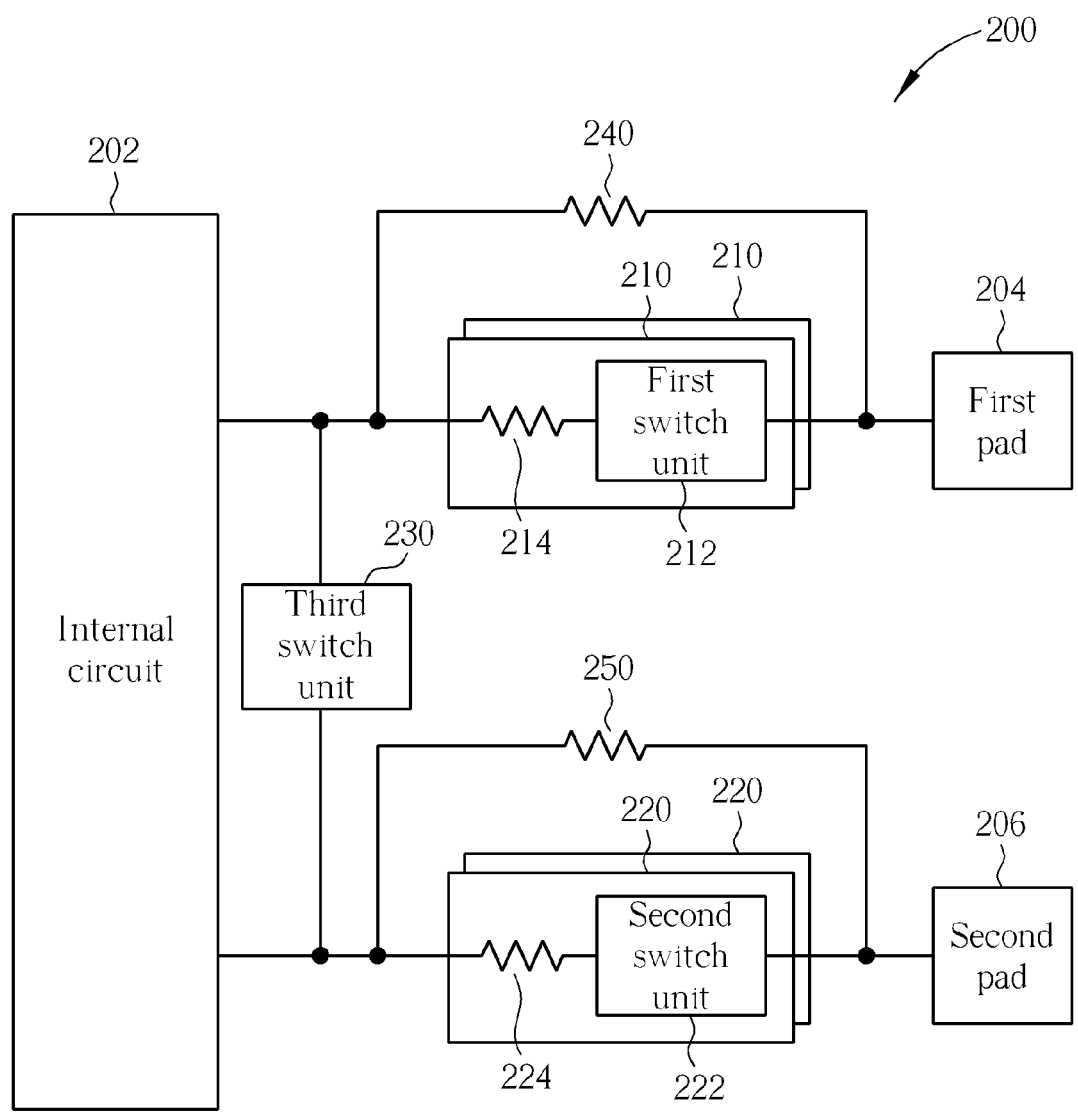
FIG. 2 shows a simplified block diagram of another conventional integrated circuit.

In addition, in each embodiment of the present invention in FIG. 8~FIG. 11, when the amounts of the first impedance matching unit 410 and the second impedance matching unit 420 both equal to N, the amount of the fourth switch unit 440 can be less than N such as N/2, and the same resistance value effect also can be achieved. In the mean time, the first switch unit 412 and the second switch unit 422 in the first impedance matching unit 410 and the second impedance matching unit 420 that are not connected to the fourth switch unit 440 have to be turned off, so as to prevent the equivalent impedance from being affected. The embodiment in FIG. 10 and the conventional integrated circuit 200 in FIG. 2 are utilized for explaining the above condition. In the conventional integrated circuit 200 in FIG. 2, after the conventional integrated circuit 200 omits the third resistance unit 240 and the fourth resistance unit 250, presumed that the conventional integrated circuit 200 comprises four first impedance matching units 210 respectively having a resistance value of 20 Ohm and four second impedance matching units 220 respectively having a resistance value of 20 Ohm (i.e. each first resistance unit 220 and each second resistance unit 220 has a resistance value of 20 Ohm), then a resistance value between the third switch unit 230 and the first pad 204 is 5 Ohm, and a resistance value between the third switch unit 230 and the second pad 206 is also 5 Ohm. A path from the first pad 204 to the second pad 206 via the third switch unit 230 has a resistance value effect of 10 Ohm. On the other hand, in the integrated circuit 400 of the present invention in FIG. 10, it is presumed that the integrated circuit 400 also comprises four first impedance matching units 410 respectively having a resistance value of 20 Ohm and four second impedance matching units 420 respectively having a resistance value of 20 Ohm, and each first resistance unit 414, each second resistance unit 416, each fourth resistance unit 424, and each eighth resistance unit 426 has a resistance value of 10 Ohm. Under the above condition, if a path from the first pad 404 to the second pad 406 via the fourth switch unit 440 is also required to have a resistance value effect of 10 Ohm, then the integrated circuit 400 only has to comprise two fourth switch units 440 to meet the above requirement. Since each first resistance unit 414 and each fourth resistance unit 424 has a resistance value of 10 Ohm, the resistance value effect of 10 Ohm can be obtained as long as there are two first resistance units 414 connected in parallel with each other and two fourth resistance units 424 connected in parallel with each other. In the mean time, the first switch unit 412 and the second switch unit 422 in the first impedance matching unit 410 and the second impedance matching unit 420 that are not connected to the fourth switch unit 440 have to be turned off, so as to prevent the equivalent impedance from being affected. In addition, as stated in the above paragraphs, the first impedance matching unit 410 can have a basic ESD protection capability as long as the resistance value of the first resistance unit 414 positioned between the first switch unit 412 and the first pad 404 is larger than 10 Ohm. Similarly, the second impedance matching unit 420 can have a basic ESD protection capability as long as the resistance value of the second resistance unit 424 positioned between the second switch unit 422 and the second pad 406 is larger than 10 Ohm. Thus, under the condition of obtaining the same resistance value effect, the impedance matching units in the integrated circuit disclosed by the present invention all can have the basic ESD protection capability. However, in the conventional integrated circuit 200 in FIG. 2, since the resistance value of four first impedance matching units 210 connected in parallel with each other is only 5 Ohm, and the resistance value of four second impedance matching units 220 connected in parallel with each other is also only 5 Ohm, the third switch unit 430 will be damaged easily and directly when ESD enters into the first pad 204 and/or the second pad 206.

Briefly summarized, the integrated circuit disclosed by the present invention has a better ESD protection capability and is able to reduce circuit layout area.

Those skilled in the art will readily observe that numerous modifications and alterations of the device and method may be made while retaining the teachings of the invention.

What is claimed is:

1. An integrated circuit having ESD protection capability, comprising:
   an internal circuit;
   a first pad; and
   at least a first impedance matching unit, coupled between the internal circuit and the first pad, and the first impedance matching unit comprising:
      a first switch unit, coupled to the internal circuit; and
      a first resistance unit, coupled between the first switch unit and the first pad, wherein the first resistance unit has a first terminal and a second terminal, the first terminal is directly electrically connected to the first pad, and the second terminal is coupled to the first switch unit.

2. The integrated circuit of claim 1, wherein when the first switch unit is not conducted, the second terminal of the first resistance unit is not directly electrically connected to the internal circuit.

3. The integrated circuit of claim 2, wherein the first impedance matching unit further comprises:
   a second resistance unit, coupled between the first switch unit and the internal circuit.

4. The integrated circuit of claim 3, wherein a sum of a resistance value of the first resistance unit and a resistance value of the second resistance unit is a fixed value.

5. The integrated circuit of claim 4, wherein a linearity and an ESD protection capability of the first impedance matching unit is decided by adjusting a ratio between the resistance value of the first resistance unit and the resistance value of the second resistance unit; when the ratio is increased, the linearity of the first impedance matching unit is decreased and the ESD protection capability of the first impedance matching unit is increased, and when the ratio is decreased, the linearity of the first impedance matching unit is increased and the ESD protection capability of the first impedance matching unit is decreased.

6. The integrated circuit of claim 1, comprising a plurality of first impedance matching units, wherein the first impedance matching units are connected in parallel with each other, and the first resistance unit of each first impedance matching unit has the same resistance value.

7. The integrated circuit of claim 1, further comprising
   a second pad;
   at least a second impedance matching unit, coupled between the internal circuit and the second pad, and the second impedance matching unit comprising:
      a second switch unit, coupled to the internal circuit; and
      a second resistance unit, coupled between the second switch unit and the second pad, wherein the second resistance unit has a first terminal and a second terminal, the first terminal of the second resistance unit is directly electrically connected to the second pad, and the second terminal of the second resistance unit is coupled to the second switch unit; and a third switch unit, coupled between the second terminal of the first resistance unit and the second terminal of the second resistance unit.

8. The integrated circuit of claim 7, comprising a plurality of first impedance matching units and a plurality of second impedance matching units, wherein the first impedance matching units are connected in parallel with each other, and the second impedance matching units are connected in parallel with each other.

9. The integrated circuit of claim 7, wherein the first impedance matching unit further comprises: a third resistance unit, coupled between the first switch unit and the internal circuit; and the second impedance matching unit further comprises: a fourth resistance unit, coupled between the second switch unit and the internal circuit.

10. The integrated circuit of claim 1, further comprising:
a third resistance unit, coupled between the first pad and the internal circuit, and connected with the first impedance matching unit in parallel.

11. The integrated circuit of claim 10, further comprising a second pad;
at least a second impedance matching unit, coupled between the internal circuit and the second pad, and the second impedance matching unit comprising:
a second switch unit, coupled to the internal circuit; and
a fourth resistance unit, coupled between the second switch unit and the second pad, wherein the fourth resistance unit has a first terminal and a second terminal, the first terminal of the fourth resistance unit is directly electrically connected to the second pad, and the second terminal of the fourth resistance unit is coupled to the second switch unit; and
a fifth resistance unit and a sixth resistance unit, the fifth resistance unit having a first terminal and a second terminal, and the sixth resistance unit having a first terminal and a second terminal, wherein the first terminal of the fifth resistance unit is directly electrically connected to the second pad and the first terminal of the fourth resistance unit, the second terminal of the fifth resistance unit is coupled to the first terminal of the sixth resistance unit, and the second terminal of the sixth resistance unit is coupled to the internal circuit and the second impedance matching unit;
a seventh resistance unit, having a first terminal and a second terminal, the third resistance unit having a first terminal and a second terminal, wherein the first terminal of the third resistance unit is directly electrically connected to the first pad and the first terminal of the first resistance unit, the second terminal of the third resistance unit is coupled to the first terminal of the seventh resistance unit, and the second terminal of the seventh resistance unit is coupled to the internal circuit and the first impedance matching unit;
a third switch unit, directly electrically connected between the first terminal of the seventh resistance unit and the first terminal of the sixth resistance unit; and
a fourth switch unit, directly electrically connected between the second terminal of the first resistance unit and the second terminal of the fourth resistance unit.

12. The integrated circuit of claim 11, wherein the first impedance matching unit further comprises:
an eighth resistance unit, coupled between the first switch unit and the internal circuit.

13. The integrated circuit of claim 12, wherein the second impedance matching unit further comprises:
a ninth resistance unit, coupled between the second switch unit and the internal circuit.

14. The integrated circuit of claim 11, comprising a plurality of first impedance matching units, wherein the first impedance matching units are connected in parallel with each other.

15. The integrated circuit of claim 14, comprising a plurality of second impedance matching units and a plurality of fourth switch units, wherein the second impedance matching units are connected in parallel with each other.

16. The integrated circuit of claim 15, wherein when amounts of the first impedance matching units and the second impedance matching units both equal to N, an amount of the fourth switch units is less than N, and at least a first switch unit in a portion of first impedance matching units not connected to the fourth switch units and at least a second switch unit in a portion of second impedance matching units not connected to the fourth switch units are not conducted.

17. The integrated circuit of claim 15, wherein when amounts of the first impedance matching units and the second impedance matching units both equal to N, an amount of the fourth switch units equal to N/2, and at least a first switch unit in a portion of first impedance matching units not connected to the fourth switch units and at least a second switch unit in a portion of second impedance matching units not connected to the fourth switch units are not conducted.

18. An integrated circuit, comprising:
an internal circuit;
a first pad; and
at least a first impedance matching unit, coupled between the internal circuit and the first pad, and the first impedance matching unit comprising:
a first switch unit, coupled to the internal circuit;
a first resistance unit, coupled between the first switch unit and the first pad, wherein the first resistance unit has a first terminal and a second terminal, the first terminal is directly electrically connected to the first pad, and the second terminal is coupled to the first switch unit;
a third resistance unit, coupled between the first pad and the internal circuit, and connected with the first impedance matching unit in parallel;
at least a second impedance matching unit, coupled between the internal circuit and the second pad, and the second impedance matching unit comprising:
a second switch unit, coupled to the internal circuit; and
a fourth resistance unit, coupled between the second switch unit and the second pad, wherein the fourth resistance unit has a first terminal and a second terminal, the first terminal of the fourth resistance unit is directly electrically connected to the second pad, and the second terminal of the fourth resistance unit is coupled to the second switch unit; and
a fifth resistance unit and a sixth resistance unit, the fifth resistance unit having a first terminal and a second terminal, and the sixth resistance unit having a first terminal and a second terminal, wherein the first terminal of the fifth resistance unit is directly electrically connected to the second pad and the first terminal of the fourth resistance unit, the second terminal of the fifth resistance unit is coupled to the first terminal of the sixth resistance unit, and the second terminal of the sixth resistance unit is coupled to the internal circuit and the second impedance matching unit;
a seventh resistance unit, having a first terminal and a second terminal, the third resistance unit having a first terminal and a second terminal, wherein the first terminal of the third resistance unit is directly electrically connected to the first pad and the first terminal of the first resistance unit, the second terminal of the third resistance unit is coupled to the first terminal of the seventh resistance unit, and the second terminal of the seventh resistance unit is coupled to the internal circuit and the first impedance matching unit;
a third switch unit, directly electrically connected between the first terminal of the seventh resistance unit and the first terminal of the sixth resistance unit; and
a fourth switch unit, directly electrically connected between the second terminal of the first resistance unit and the second terminal of the fourth resistance unit.

* * * * *